United States Patent
Roy et al.

(10) Patent No.: US 8,542,893 B2
(45) Date of Patent: Sep. 24, 2013

(54) SYSTEM AND METHOD OF PULMONARY EMBOLI DETECTION FOR COMPUTED TOMOGRAPHY

(75) Inventors: Arunabha Roy, Bangalore (IN); Sandeep Dutta, Waukesha, WI (US); Srikanth Suryanarayanan, Bangalore (IN); Umesha Perdoor Srinivas Adiga, Loveland, OH (US)

(73) Assignee: General Electric Company, Schenectady, NY (US)

( * ) Notice: Subject to any disclaimer, the term of this patent is extended or adjusted under 35 U.S.C. 154(b) by 582 days.

(21) Appl. No.: 12/705,672

(22) Filed: Feb. 15, 2010

(65) Prior Publication Data

US 2011/0200241 A1 Aug. 18, 2011

(51) Int. Cl.
*G06K 9/00* (2006.01)
(52) U.S. Cl.
USPC ........................................................ 382/128
(58) Field of Classification Search
USPC ................ 358/3.26; 382/128, 130, 131, 254; 600/407
See application file for complete search history.

(56) References Cited

U.S. PATENT DOCUMENTS

| | | | | |
|---|---|---|---|---|
| 2003/0044055 | A1* | 3/2003 | Park et al. | 382/130 |
| 2004/0027618 | A1* | 2/2004 | Nakamura et al. | 358/3.26 |
| 2004/0032977 | A1* | 2/2004 | Blezek et al. | 382/128 |
| 2004/0208385 | A1* | 10/2004 | Jiang | 382/254 |
| 2005/0240094 | A1* | 10/2005 | Pichon et al. | 600/407 |
| 2006/0133658 | A1* | 6/2006 | Spahn | 382/128 |
| 2009/0012382 | A1* | 1/2009 | Dutta et al. | 600/407 |
| 2011/0142313 | A1* | 6/2011 | Pack et al. | 382/131 |

OTHER PUBLICATIONS

Yu et al., "A Fast and Adaptive Method for Image Contrast Enhancement," Department of Computer Sciences, University of Texas at Austin, Austin, TX, USA, IEEE, pp. 1001-1004, 2004.
Park et al., "Automatic Pulmonary Embolus Detection and VisualizationAutomatic Visualization".
Park, "Artery-Vein Separation from Thoracic CTA Scans with Application to PE Detection and Volume Visualization," Dissertation, The University of Texas at Austin, Dec. 2006.

* cited by examiner

*Primary Examiner* — Valerie Lubin
(74) *Attorney, Agent, or Firm* — Ziolkowski Patent Solutions Group, SC

(57) ABSTRACT

A system and method includes acquisition of a set of image data comprising a plurality of image voxels and isolation of a set of pulmonary emboli candidates from the plurality of image voxels. The system and method also includes application of a non-linear contrast enhancement to the set of pulmonary emboli candidates, filtration of the enhanced set of pulmonary emboli candidates, output of a final set of pulmonary emboli candidates, and creation of an image comprising the final set of pulmonary emboli candidates.

25 Claims, 6 Drawing Sheets

SYSTEM AND METHOD OF PULMONARY EMBOLI DETECTION FOR COMPUTED TOMOGRAPHY

BACKGROUND OF THE INVENTION

Embodiments of the invention relate generally to diagnostic imaging and, more particularly, to a system and method of pulmonary emboli detection for computed tomography.

Typically, in computed tomography (CT) imaging systems, an x-ray source emits a fan-shaped beam toward a subject or object, such as a patient or a piece of luggage. Hereinafter, the terms "subject" and "object" shall include anything capable of being imaged. The beam, after being attenuated by the subject, impinges upon an array of radiation detectors. The intensity of the attenuated beam radiation received at the detector array is typically dependent upon the attenuation of the x-ray beam by the subject. Each detector element of the detector array produces a separate electrical signal indicative of the attenuated beam received by each detector element. The electrical signals are transmitted to a data processing system for analysis which ultimately produces an image.

Generally, the x-ray source and the detector array are rotated about the gantry within an imaging plane and around the subject. X-ray sources typically include x-ray tubes, which emit the x-ray beam at a focal point. X-ray detectors typically include a collimator for collimating x-ray beams received at the detector, a scintillator for converting x-rays to light energy adjacent the collimator, and photodiodes for receiving the light energy from the adjacent scintillator and producing electrical signals therefrom.

Typically, each scintillator of a scintillator array converts x-rays to light energy. Each scintillator discharges light energy to a photodiode adjacent thereto. Each photodiode detects the light energy and generates a corresponding electrical signal. The outputs of the photodiodes are then transmitted to the data processing system for image reconstruction. Alternatively, x-ray detectors may use a direct conversion detector, such as a CZT detector, in lieu of a scintillator.

Contrast enhanced CT images are typically used to detect pulmonary emboli within the pulmonary vessels. Simple thresholds, linear contrast enhancements, intensity information, and/or knowledge of the neighborhood of image voxels are typically used to generate contrast enhanced CT images. Alternatively, large banks of information acquired from a large number of CT images may be used to train classifiers, which are then used to predict whether identified or calculated features or characteristics of three-dimensional regions in an image represent pulmonary emboli or normal anatomy.

Conventional methods of generating contrast enhanced CT images typically rely on a number of assumed features of pulmonary emboli. However, these assumptions often detect normal anatomy as pulmonary emboli (i.e., false positives). False positives may be detected due to a number of causes, including lymph nodes, water-filled airways, airway walls with intermediate intensity resulting from partial volume effects, motion, streak and/or other acquisition artifacts, and images of inadequate contrast resulting from improperly administered contrast schedules, for example.

Therefore, it would be desirable to design a system and method of detecting pulmonary emboli that overcome the aforementioned drawbacks.

BRIEF DESCRIPTION OF THE INVENTION

In accordance with one aspect of the invention, a computer readable storage medium has stored thereon a computer program comprising instructions, which, when executed by a computer, cause the computer to acquire a set of image data comprising a plurality of image voxels and isolate a set of pulmonary emboli candidates from the plurality of image voxels. The instructions also cause the computer to apply a non-linear contrast enhancement to the set of pulmonary emboli candidates, filter the enhanced set of pulmonary emboli candidates, output a final set of pulmonary emboli candidates, and create an image comprising the final set of pulmonary emboli candidates.

In accordance with another aspect of the invention, a method includes accessing a set of CT image data corresponding to a plurality of image voxels, applying a lung mask to the plurality of image voxels, and isolating a set of pulmonary emboli candidates in the lung mask. The method also includes manipulating the set of pulmonary emboli candidates using a non-linear contrast enhancement, removing a set of false positive voxels from the set of pulmonary emboli candidates, generating a final set of pulmonary emboli candidates, and reconstructing an image using the final set of pulmonary emboli candidates.

In accordance with another aspect of the invention, an imaging system includes a rotatable gantry having an opening for receiving an object to be scanned, an x-ray source coupled to the rotatable gantry and configured to project x-rays through the opening, and a generator configured to energize the x-ray source to an energy level to generate x-rays corresponding to the energy level. The imaging system further includes a detector having pixels therein, the detector attached to the rotatable gantry and positioned to receive x-rays projected from the x-ray source. The imaging system also includes a computer programmed to acquire a CT image dataset corresponding to a plurality of image voxels, identify a set of pulmonary emboli candidates within the CT image data set, filter the set of pulmonary emboli candidates to remove false positives, and output a final set of pulmonary emboli candidates.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

The operating environment of embodiments of the invention is described with respect to a sixty-four-slice computed tomography (CT) system. However, it will be appreciated by those skilled in the art that embodiments of the invention are equally applicable for use with other multi-slice configurations. Moreover, embodiments of the invention will be described with respect to the detection and conversion of x-rays. However, one skilled in the art will further appreciate that embodiments of the invention are equally applicable for the detection and conversion of other high frequency electromagnetic energy. Embodiments of the invention will be described with respect to a "third generation" CT scanner, but are equally applicable with other CT systems.

Figure 1:
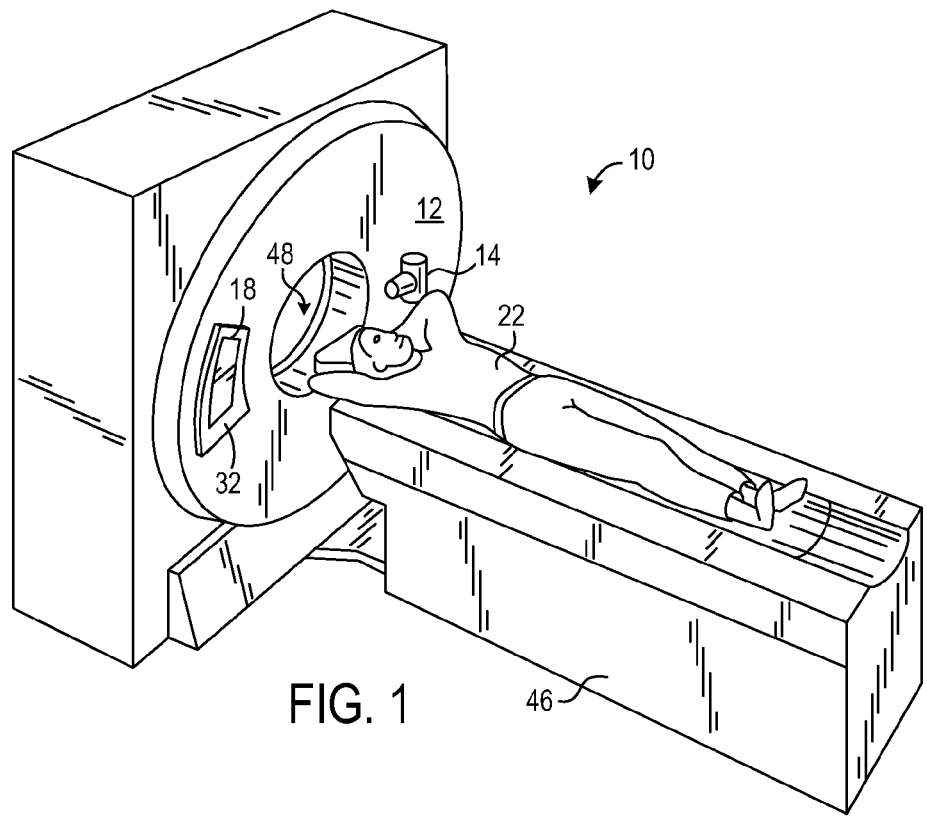
FIG. 1 is a pictorial view of a CT imaging system.
Figure 2:
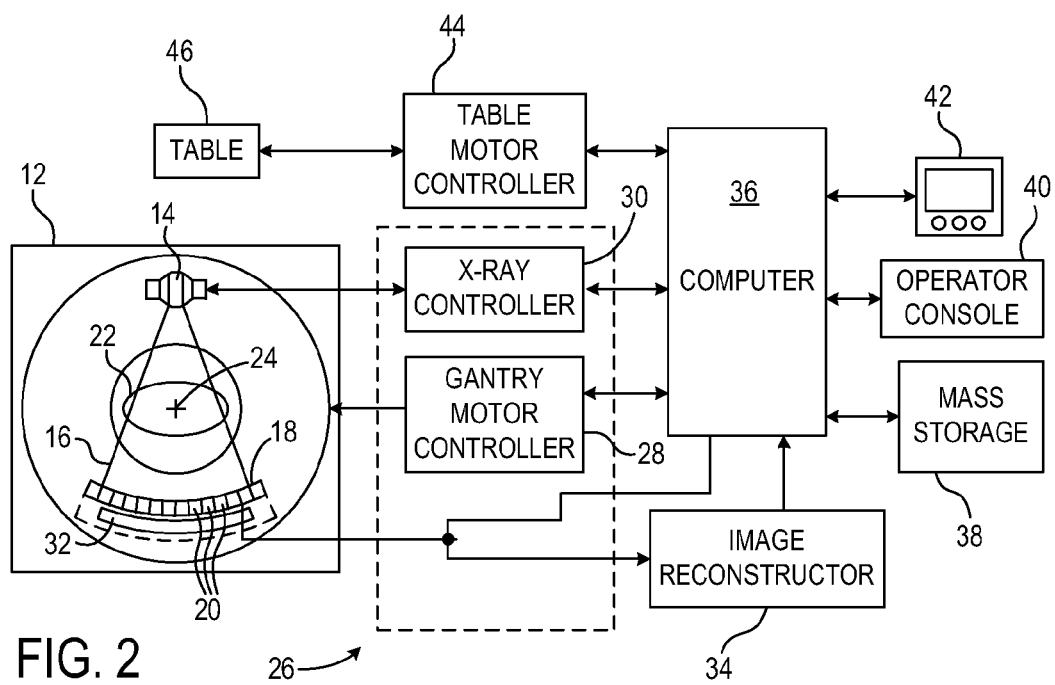
FIG. 2 is a block schematic diagram of the system illustrated in FIG. 1.

Referring to FIG. 1, a computed tomography (CT) imaging system 10 is shown as including a gantry 12 representative of a "third generation" CT scanner. Gantry 12 has an x-ray source 14 that projects a beam of x-rays toward a detector assembly or collimator 18 on the opposite side of the gantry 12. Referring now to FIG. 2, detector assembly 18 is formed by a plurality of detectors 20 and data acquisition systems (DAS) 32. The plurality of detectors 20 sense the projected x-rays 16 that pass through a medical patient 22, and DAS 32 converts the data to digital signals for subsequent processing. Each detector 20 produces an analog electrical signal that represents the intensity of an impinging x-ray beam and hence the attenuated beam as it passes through the patient 22. During a scan to acquire x-ray projection data, gantry 12 and the components mounted thereon rotate about a center of rotation 24.

Rotation of gantry 12 and the operation of x-ray source 14 are governed by a control mechanism 26 of CT system 10. Control mechanism 26 includes an x-ray controller 28 that provides power and timing signals to an x-ray source 14 and a gantry motor controller 30 that controls the rotational speed and position of gantry 12. An image reconstructor 34 receives sampled and digitized x-ray data from DAS 32 and performs high speed reconstruction. The reconstructed image is applied as an input to a computer 36 which stores the image in a mass storage device 38.

Computer 36 also receives commands and scanning parameters from an operator via console 40 that has some form of operator interface, such as a keyboard, mouse, voice activated controller, or any other suitable input apparatus. An associated display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 and gantry 12. Particularly, table 46 moves patients 22 through a gantry opening 48 of FIG. 1 in whole or in part.

Figure 3:
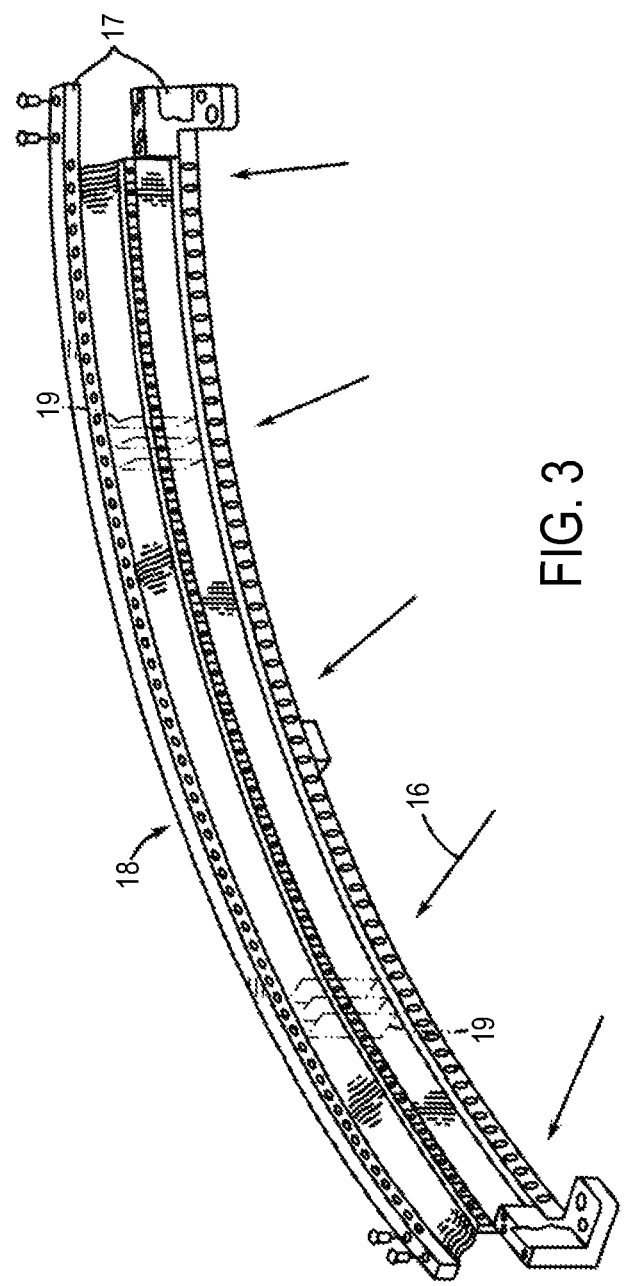
FIG. 3 is a perspective view of one embodiment of a CT system detector array.

As shown in FIG. 3, detector assembly 18 includes rails 17 having collimating blades or plates 19 placed therebetween. Plates 19 are positioned to collimate x-rays 16 before such beams impinge upon, for instance, detector 20 of FIG. 4 positioned on detector assembly 18. In one embodiment, detector assembly 18 includes 57 detectors 20, each detector 20 having an array size of 64×16 of pixel elements 50. As a result, detector assembly 18 has 64 rows and 912 columns (16×57 detectors) which allows 64 simultaneous slices of data to be collected with each rotation of gantry 12.

Figure 4:
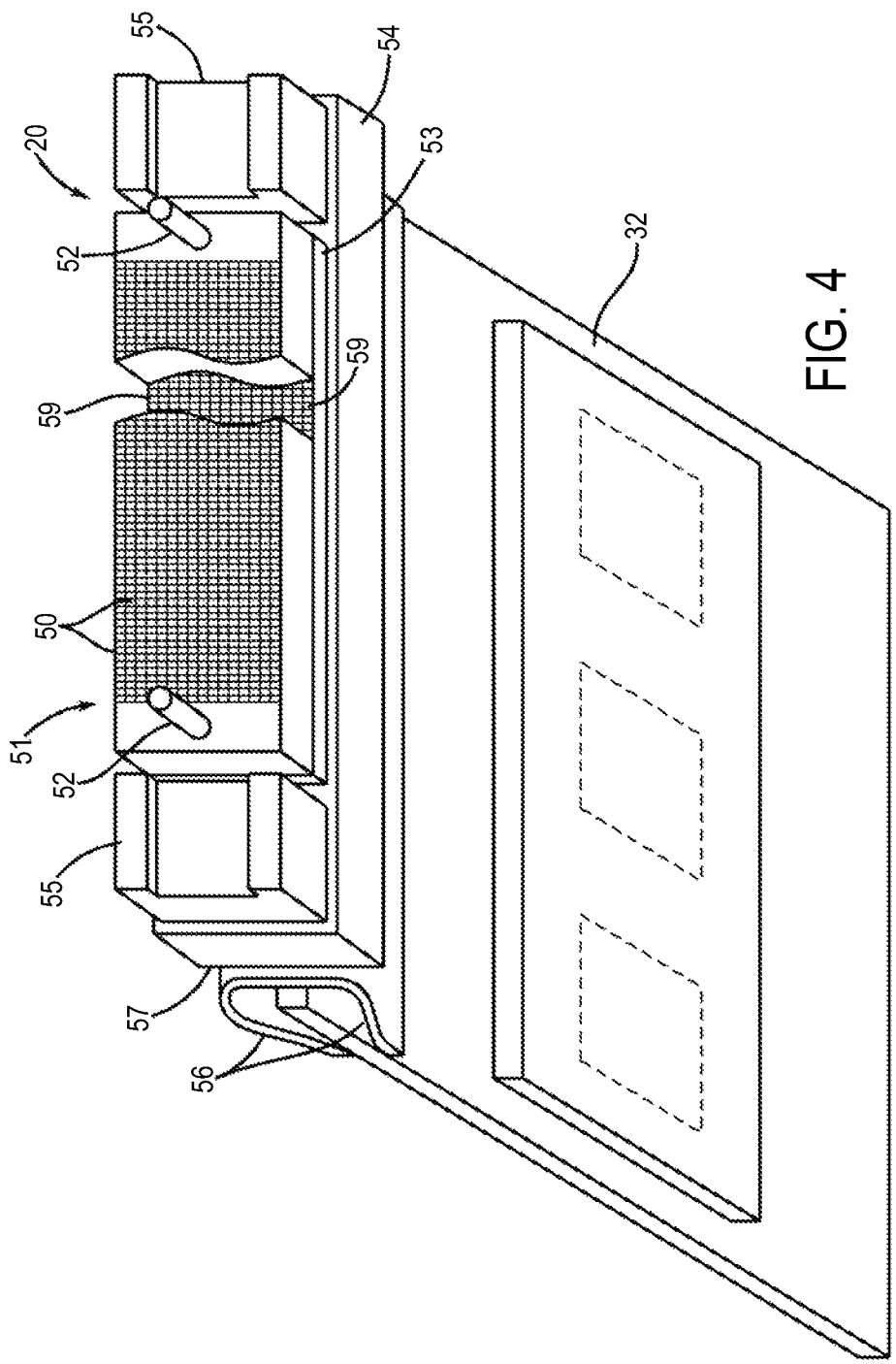
FIG. 4 is a perspective view of one embodiment of a detector.

Referring to FIG. 4, detector 20 includes DAS 32, with each detector 20 including a number of detector elements 50 arranged in pack 51. Detectors 20 include pins 52 positioned within pack 51 relative to detector elements 50. Pack 51 is positioned on a backlit diode array 53 having a plurality of diodes 59. Backlit diode array 53 is in turn positioned on multi-layer substrate 54. Spacers 55 are positioned on multi-layer substrate 54. Detector elements 50 are optically coupled to backlit diode array 53, and backlit diode array 53 is in turn electrically coupled to multi-layer substrate 54. Flex circuits 56 are attached to face 57 of multi-layer substrate 54 and to DAS 32. Detectors 20 are positioned within detector assembly 18 by use of pins 52.

In the operation of one embodiment, x-rays impinging within detector elements 50 generate photons which traverse pack 51, thereby generating an analog signal which is detected on a diode within backlit diode array 53. The analog signal generated is carried through multi-layer substrate 54, through flex circuits 56, to DAS 32 wherein the analog signal is converted to a digital signal.

Figure 5:
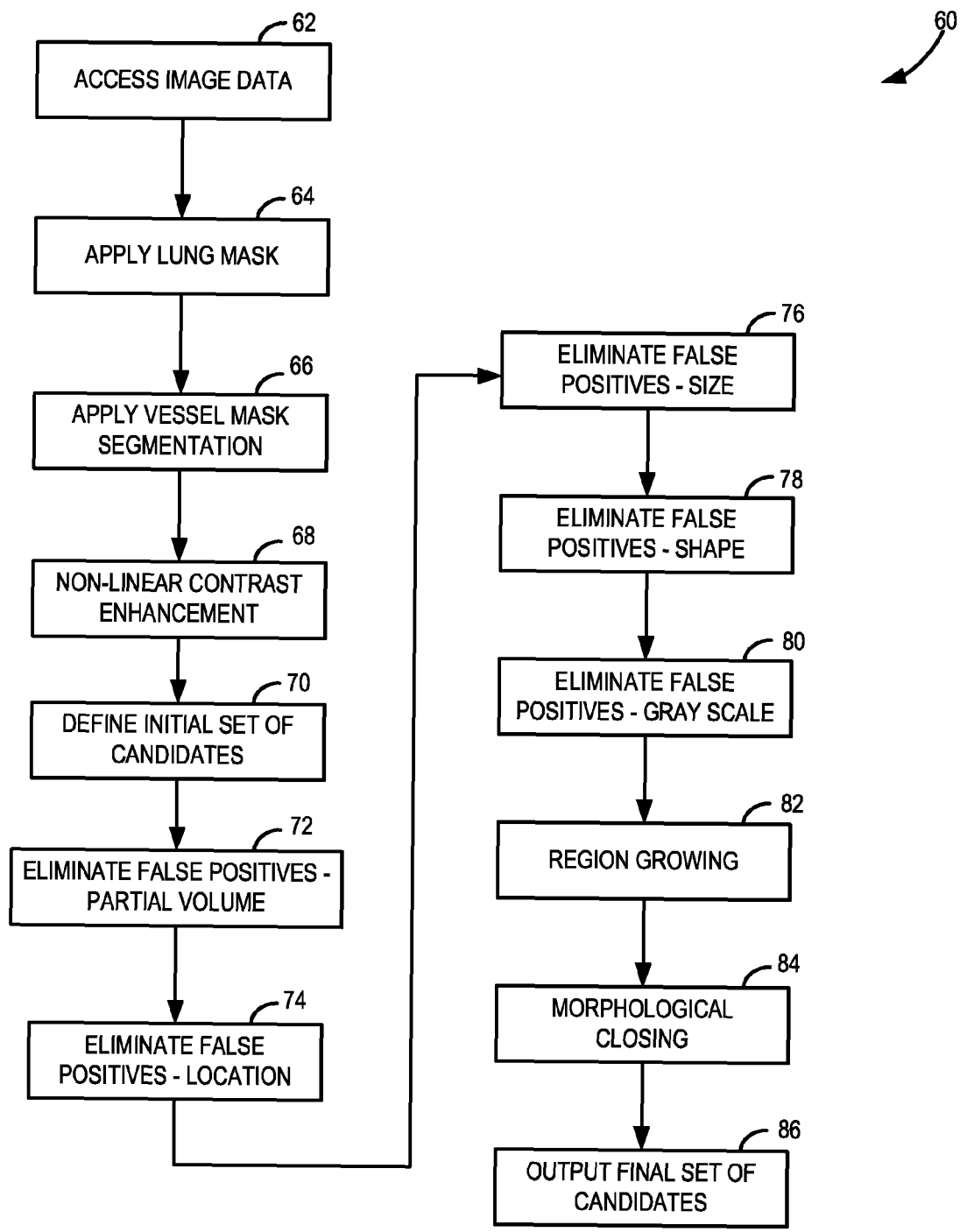
FIG. 5 is a flowchart illustrating a technique for pulmonary emboli detection according to embodiments of the invention.

Referring now to FIG. 5, a computer-implemented technique 60 for detection of pulmonary emboli in CT images is set forth. According to embodiments of the invention, technique 60 may be performed, for example, by computer 36 of FIG. 2 by way of a computer readable storage medium having stored thereon a computer program comprising a number of instructions. Technique 60 begins at step 62 by acquiring or accessing CT image data corresponding to the thorax or pulmonary region of a patient. At step 64, technique 60 applies a lung mask to the CT image data to isolate the CT image data corresponding to two lung lobes.

After isolating the lung lobes in the CT image data, technique 60 applies a vessel mask segmentation at step 66. The vessel segmentation is used to extract a mask of pulmonary emboli within the parenchyma region. Technique 60 calculates an intensity threshold for each slice of image data that models the intensity decrease of the parenchyma region moving outward from the hilum towards the extremities of arterial branching. According to one embodiment, the thresholding is applied as follows:

$$T = \mathrm{argmin}\left[\begin{array}{l} P(T)\log(\sigma_f(T)) + (1 - P(T))\log(\sigma_b(T)) - \\ P(T)\log(P(T)) - (1 - P(T))\log(1 - P(T)) \end{array}\right] + \qquad \text{(Eqn. 1)}$$
$$\left\{\left(1.0 - e^{\left(\frac{-5.0}{\sqrt{(x_i - x_0)^2} + (\sqrt{(y_i + y_0)^2})}\right)}\right) \cdot \beta\right\}$$

where the first term represents Kittler's minimum error threshold, the second term represents the intensity profile from the image center ($x_0$, $y_0$), and $\beta$ represents an experimental constant.

Based on clinical data, it is known that voxels near the hilum are not pulmonary emboli. Accordingly, technique 60 eliminates connecting tissue present within the hilum vicinity. According to one embodiment of the invention, voxels within a given radius (e.g., approximately 96 voxels) of a circle centered at the origin are clustered based on their intensity values using a k-means clustering algorithm. The intensity threshold for this central circle is modified and voxels within this cluster may be eliminated from the vessel mask. Voxels outside the central circle are unchanged.

During step 66, technique 60 also eliminates diaphragm components that may be present within the vessel mask. Diaphragm remnants are large regions containing voxels of intermediate intensity and may contribute to false positive emboli detections. Because it is known that pulmonary emboli will not be as large as the diaphragm, a distance transform may be applied to the 2D binary image such that, for each 2D connected object, the largest value of the distance transform is estimated and objects having a value greater than a given threshold value are eliminated. According to one embodiment, a threshold value of 40 pixels may be applied to eliminate diaphragm components.

Technique 60 may also be configured to fill small holes having an area less than a threshold area (e.g., less than 50 voxels) that exist after the threshold in the image mask. Additionally, technique 60 may refine the outer boundary of the generated mask at step 66.

After completing the mask of pulmonary emboli within the parenchyma region, technique 60 applies non-linear contrast enhancement at step 68 to increase the contrast between bright and dark intensity and simplify identification of embolus detection in the CT image. The non-linear contrast enhancement applied at step 68 enhances contrast locally within a pre-defined window region, allowing the vessel intensities to be stretched over the major portion of the gray scale range of the image and enhancing the contrast between light and dark structures that may have a relatively small difference in contrast based on the initially scaled image. According to one embodiment, the image is initially scaled to a range of 0-255 Hounsfield units (HU). However, one skilled in the art will recognize that technique 60 is equally applicable to any initial image scaling.

Figure 6:
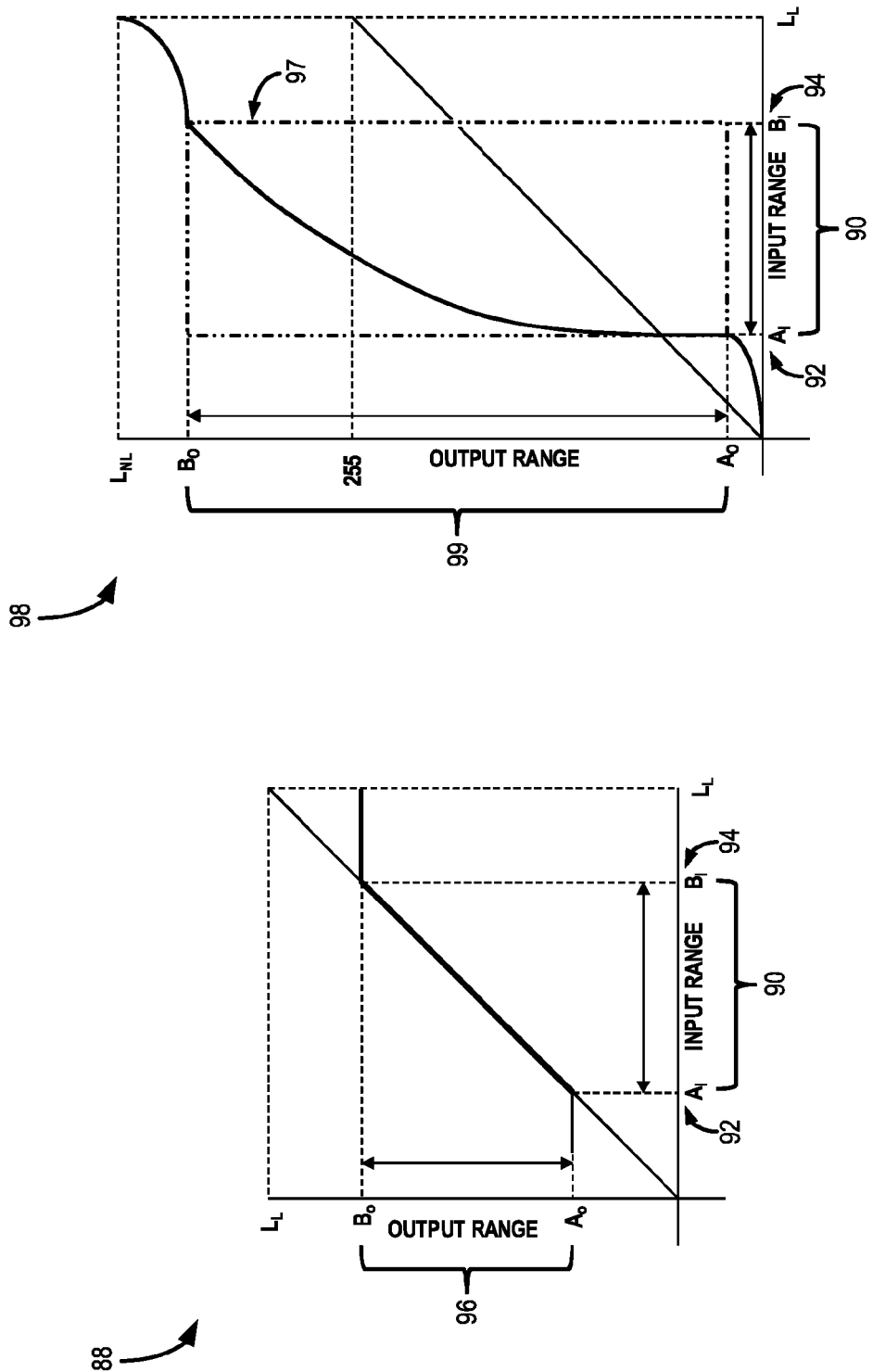
FIG. 6 is a set of graphs illustrating exemplary linear and non-linear contrast enhancement techniques.

Referring now to FIG. 6, the difference between linear contrast enhancement and non-linear contrast enhancement is illustrated. Graph 88 illustrates an exemplary linear contrast enhancement given a gray scale range between 0 and an upper limit, $L_L$. As shown, an input contrast range 90 between an input contrast value, $A_0$, of a first voxel A 92 and an input contrast value, $B_0$, of a second voxel B 94 is linearly enhanced to have an output contrast range 96. Graph 98, on the other hand, illustrates an exemplary non-linear contrast enhancement wherein contrast is enhanced locally within a pre-defined window region 97. Given input contrast range 90, the contrast between voxel A 92 and voxel B 94 is non-linearly enhanced to have an output contrast range 99, which is much larger than output contrast range 96 of the linear contrast enhancement. As illustrated in graph 98, while the non-linear enhancement begins with the same input gray scale range as the linear contrast enhancement, the output range of the non-linear enhancement is upscaled to a range of 0 to an upper limit, $L_{NL}$, which is higher than $L_L$.

Referring back to FIG. 5, following the non-linear contrast enhancement of step 68, technique 60 defines an initial set of pulmonary emboli candidates at step 70 as the connected group of pixels whose gray values are within a defined portion of the scaled image data. For example, according to one embodiment, the set of pulmonary emboli candidates is defined as the group of voxels having gray values within a range of approximately 0-100 HU in a set of image data scaled to a range of 0-255 HU. Each voxel within the set of pulmonary emboli candidates has a set of two contrast values corresponding thereto: a non-enhanced contrast value corresponding to the unscaled image data and a scaled contrast value determined using the non-linear contrast enhancement of step 68.

Next, technique 60 uses the scaled contrast values to reduce false positives within the defined candidate set using a number of filtering steps.

For example, at step 72, technique 60 removes pulmonary emboli candidates that lie on the outer periphery or boundary of the large vessels near the hilum, as these candidates are partial volume artifacts. For example, voxels having a distance lower than three voxels from the vessel boundary may be removed from the candidate set.

Technique 60 applies another filter at step 74 that may eliminate a number of pulmonary emboli candidates based on their location, as certain areas of the lungs have a greater possibility of housing pulmonary emboli and other regions of the lungs have a greater possibility of producing false positives. Technique 60 also uses mathematical morphology operations to define a wall region corresponding to an area very close to the edge of the lung mask. Pulmonary emboli candidates that are located within the wall region are removed.

At step 76, false positives are eliminated using one or more size filters. Technique 60 may implement a two-dimensional size filter to remove false positives that are outside a given size range, such as, for example, a range of approximately 4-2000 pixels. Technique 60 may also implement a three-dimensional size filter to remove candidates greater than a given threshold. For example, pulmonary emboli candidates greater than 30 voxels may be removed.

Technique 60 further reduces false positives at step 78 based on the knowledge that, although a pulmonary emboli may not have a specific shape, it will the signature of the pulmonary emboli will manifest across a number of connected image slices. Thus, technique 60 applies a filter to remove pulmonary emboli candidates that have signatures only in one image slice or only in a small number of connected image slices, according to various embodiments. For example, according to one embodiment, technique 60 examines the z-coordinates of the pulmonary emboli candidates and eliminates those candidates not connected across at least three adjacent image slices.

According to another embodiment of the invention, technique 60 may apply other filters as alternative three-dimensional processing steps to the set of pulmonary emboli candidates. These filters may be applied in addition to, or as alternatives to, the filters described with respect to steps 72-78, according to different embodiments. For example, technique 60 may apply volumetric directional diffusion, inverse diffusion, and/or mean-shift filtering to the image dataset.

In step 80, technique 60 eliminates all pulmonary emboli candidates having unscaled contrast values outside the gray scale range of the original image dataset (e.g., outside a gray scale range of −500 to +1200 HU).

At step 82, the remaining pulmonary emboli candidates are subjected to a region growing step that uses pixel intensity, two-dimensional distance transform values, and three-dimensional distance transform values to grow the given pulmonary emboli candidates into adjoining voxels. According to one embodiment, the region growing is confined to refinement structure region in the z-direction.

Technique 60 performs a morphological closing operation at step 84 that is similar to the closing filter described with respect to step 66 in order to account for any jagged edges or holes that result from the thresholding operations. The morphological closing operation fills holes below a given size that may exist within pulmonary emboli candidates. To fill the holes, the operation references neighboring voxels. At step 86, technique 60 outputs a final set of pulmonary emboli candidates.

Embodiments of the invention have been described with respect to single and energy CT imaging. However, one skilled in the art will recognize that embodiments of the invention are equally applicable to dual energy CT imaging procedures, for example.

Figure 7:
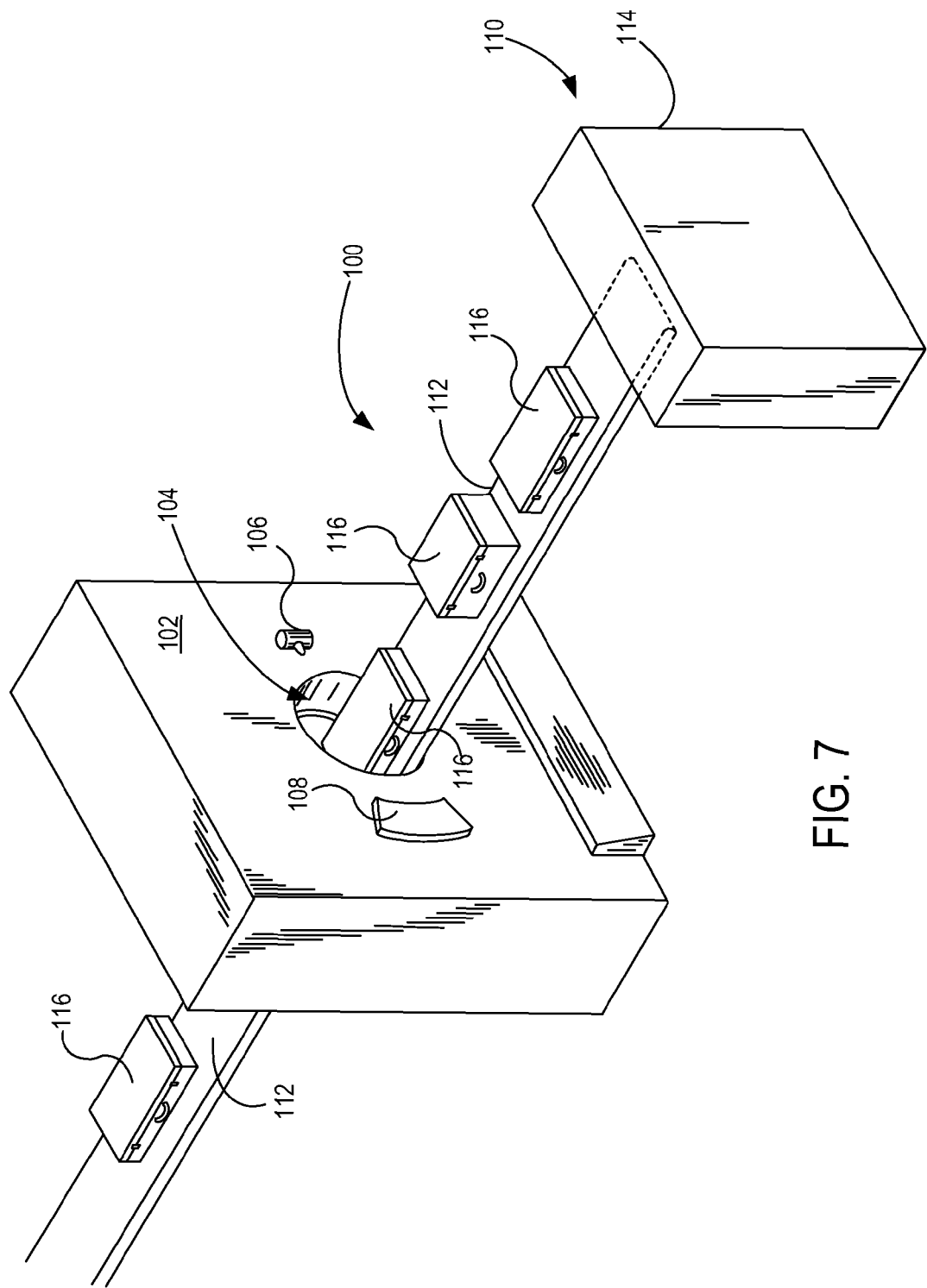
FIG. 7 is a pictorial view of a CT system for use with a non-invasive package inspection system.

Referring now to FIG. 7, package/baggage inspection system 100 includes a rotatable gantry 102 having an opening 104 therein through which packages or pieces of baggage may pass. The rotatable gantry 102 houses a high frequency electromagnetic energy source 106 as well as a detector assembly 108 having scintillator arrays comprised of scintillator cells similar to that shown in FIGS. 3 and 4. A conveyor system 110 is also provided and includes a conveyor belt 112 supported by structure 114 to automatically and continuously pass packages or baggage pieces 116 through opening 104 to be scanned. Objects 116 are fed through opening 104 by conveyor belt 112, imaging data is then acquired, and the conveyor belt 112 removes the packages 116 from opening 104 in a controlled and continuous manner. As a result, postal inspectors, baggage handlers, and other security personnel may non-invasively inspect the contents of packages 116 for explosives, knives, guns, contraband, etc.

Embodiments of the invention have been described with respect to single energy CT imaging. However, one skilled in the art will recognize that embodiments of the invention are equally applicable to dual energy CT imaging procedures, for example. Embodiments of the invention described herein are equally applicable to other types of tomographic imaging such as CT attenuation correction images for single photon emission computed tomography (SPECT) or positron emission tomography (PET), three-dimensional x-ray imaging, vascular and surgical C-arm systems, radiation therapy planning scanners, other tomographic x-ray systems, and the like.

A technical contribution for the disclosed method and apparatus is that is provides for a computer implemented system and method of iterative pulmonary emboli detection for computed tomography.

Therefore, in accordance with one embodiment, a computer readable storage medium has stored thereon a computer program comprising instructions, which, when executed by a computer, cause the computer to acquire a set of image data comprising a plurality of image voxels and isolate a set of pulmonary emboli candidates from the plurality of image voxels. The instructions also cause the computer to apply a non-linear contrast enhancement to the set of pulmonary emboli candidates, filter the enhanced set of pulmonary emboli candidates, output a final set of pulmonary emboli candidates, and create an image comprising the final set of pulmonary emboli candidates.

In accordance with another embodiment, a method includes accessing a set of CT image data corresponding to a plurality of image voxels, applying a lung mask to the plurality of image voxels, and isolating a set of pulmonary emboli candidates in the lung mask. The method also includes manipulating the set of pulmonary emboli candidates using a non-linear contrast enhancement, removing a set of false positive voxels from the set of pulmonary emboli candidates, generating a final set of pulmonary emboli candidates, and reconstructing an image using the final set of pulmonary emboli candidates.

In accordance with yet another embodiment, an imaging system includes a rotatable gantry having an opening for receiving an object to be scanned, an x-ray source coupled to the rotatable gantry and configured to project x-rays through the opening, and a generator configured to energize the x-ray source to an energy level to generate x-rays corresponding to the energy level. The imaging system further includes a detector having pixels therein, the detector attached to the rotatable gantry and positioned to receive x-rays projected from the x-ray source. The imaging system also includes a computer programmed to acquire a CT image dataset corresponding to a plurality of image voxels, identify a set of pulmonary emboli candidates within the CT image data set, filter the set of pulmonary emboli candidates to remove false positives, and output a final set of pulmonary emboli candidates.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A non-transitory computer readable storage medium having stored thereon a computer program comprising instructions, which, when executed by a computer, cause the computer to:
    acquire a set of image data comprising a plurality of image voxels;
    isolate a set of pulmonary emboli candidates from the plurality of image voxels, the set of pulmonary emboli candidates comprising a subset of the plurality of image voxels;
    apply a non-linear contrast enhancement to the subset of the plurality of image voxels comprising the set of pulmonary emboli candidates;
    assign pairs of contrast values to the set of pulmonary emboli candidates, wherein a first contrast value of a respective pair of contrast values corresponds to the non-linear contrast enhancement and a second contrast value of a respective pair of contrast values corresponds to a gray scale range of the initial set of image data;
    apply a first filter to the set of pulmonary emboli candidates based on the first contrast values to generate a filtered set of pulmonary emboli candidates;
    apply a second filter to the filtered set of pulmonary emboli candidates to generate a final set of pulmonary emboli candidates, wherein applying the second filter comprises removing pulmonary emboli candidates having second contrast values outside the gray scale range;
    output the final set of pulmonary emboli candidates; and
    create an image visually depicting the final set of pulmonary emboli candidates.

2. The computer readable storage medium of claim 1 wherein the instructions cause the computer to:
    apply a lung mask to the set of image data;
    define a wall region in an area proximate to an edge of the lung mask; and
    remove pulmonary emboli candidates located within the wall region from the set of pulmonary emboli candidates.

3. The computer readable storage medium of claim 1 wherein the instructions further cause the computer to:
    locally increase contrast within a pre-defined region of the gray scale range; and
    remove pulmonary emboli candidates having first contrast values outside a range of approximately 0 to 100 HU from the set of pulmonary emboli candidates.

4. The computer readable storage medium of claim 1 wherein the instructions cause the computer to apply a location-based filter to remove pulmonary emboli candidates located a predetermined distance from a vessel boundary from the set of pulmonary emboli candidates.

5. The computer readable storage medium of claim 1 wherein the instructions cause the computer to apply a size-based filter to remove pulmonary emboli candidates greater than a predetermined threshold from the set of pulmonary emboli candidates.

6. The computer readable storage medium of claim 1 wherein the instructions that cause the computer to remove pulmonary emboli candidates having signatures unconnected across less than three adjacent image slices from the set of pulmonary emboli candidates.

7. The computer readable storage medium of claim 1 wherein the instructions cause the computer to apply a combination of two-dimensional filters and three-dimensional filters to the set of pulmonary emboli candidates.

8. The computer readable storage medium of claim 1 wherein the instructions cause the computer to remove pulmonary emboli candidates outside a gray scale range of approximately −500 to +1200 HU from the filtered set of pulmonary emboli candidates.

9. The computer readable storage medium of claim 1 wherein the instructions that cause the computer to isolate the set of pulmonary emboli candidates from the plurality of image voxels cause the computer to:
calculate an intensity threshold corresponding to a plurality of slices of the set of image data; and
model a change in intensity of the plurality of image voxels based on the intensity threshold.

10. A method comprising:
using a computed tomography (CT) scanner to perform the following steps:
accessing a set of CT image data corresponding to a plurality of image voxels;
applying a lung mask to the plurality of image voxels;
isolating a set of pulmonary emboli candidates in the lung mask;
assigning unscaled contrast values to the set of pulmonary emboli candidates;
manipulating the set of pulmonary emboli candidates using a non-linear contrast enhancement;
assigning scaled contrast values to the manipulated set of pulmonary emboli candidates;
identifying a first set of false positive pulmonary emboli candidates from the unscaled contrast values, the first set of false positive pulmonary emboli candidates having unscaled contrast values outside a gray scale range of the set of CT image data;
identifying a second set of false positive pulmonary emboli candidates from the scaled contrast values;
removing the first and second sets of false positive pulmonary emboli candidates from the set of pulmonary emboli candidates to generate a final set of pulmonary emboli candidates; and
reconstructing an image using the final set of pulmonary emboli candidates.

11. The method of claim 10 comprising identifying the second set of false positive pulmonary emboli candidates using a combination of two-dimensional filters and three-dimensional filters.

12. The method of claim 11 comprising applying a location-based filter to remove a set of pulmonary emboli candidates located a predetermined distance from at least one of a vessel boundary and an edge of the lung mask.

13. The method of claim 11 comprising removing pulmonary emboli candidates having gray-scale values outside a gray-scale range of approximately −500 to +1200 HU.

14. The method of claim 10 further comprising applying a morphological closing operation to the set of pulmonary emboli candidates.

15. An imaging system comprising:
a rotatable gantry having an opening for receiving an object to be scanned;
an x-ray source coupled to the rotatable gantry and configured to project x-rays through the opening;
a generator configured to energize the x-ray source to an energy level to generate x-rays corresponding to the energy level;
a detector having pixels therein, the detector attached to the rotatable gantry and positioned to receive x-rays projected from the x-ray source; and
a computer programmed to:
acquire a CT image dataset corresponding to a plurality of image voxels;
apply a plurality of masks to the CT image dataset to identify an initial set of pulmonary emboli candidates within the CT image data set;
apply a non-linear contrast enhancement only to image data corresponding to the initial set of pulmonary emboli candidates;
generate a contrast-enhanced set of pulmonary emboli candidates based on the applied non-linear contrast enhancement;
identify a first set of false positive pulmonary emboli candidates within the contrast-enhanced set of pulmonary emboli candidates;
identify a second set of false positive pulmonary emboli candidates within the initial set of pulmonary emboli candidates, the second set of false positive pulmonary emboli candidates distinct from the first set of false positive pulmonary emboli candidates;
remove the first and second sets of false positive pulmonary emboli candidates from the initial set of pulmonary emboli candidates to generate a final set of pulmonary emboli candidates; and
output the final set of pulmonary emboli candidates.

16. The imaging system of claim 15 wherein the computer is programmed to remove voxels having contrast values outside a gray scale range of the CT image dataset from the initial set of pulmonary emboli candidates.

17. The imaging system of claim 15 wherein the computer is programmed to filter the initial set of pulmonary emboli candidates using at least one of a two-dimensional filter and a three-dimensional filter.

18. The imaging system of claim 15 wherein the computer is programmed to:
calculate an intensity threshold corresponding to each slice of image data of the set of image data; and
model a change in intensity of the plurality of image voxels based on the intensity threshold.

19. The imaging system of claim 15 wherein the computer is programmed to:
apply a lung mask to the CT image dataset to isolate image data corresponding to lung lobes;
apply a vessel segmentation to the isolated image data to extract a pulmonary emboli mask; and
identify the initial set of pulmonary emboli candidates from the pulmonary emboli mask.

20. The computer readable storage medium of claim 1 wherein the instructions cause the computer to:
identify a subset of pulmonary emboli candidates in the set of pulmonary emboli candidates having signatures in only one image slice of the plurality of slices; and
remove the subset of pulmonary emboli candidates from the set of pulmonary emboli candidates.

21. The computer readable storage medium of claim 2 wherein the instructions cause the computer to:
apply a vessel segmentation to the masked image data to extract a pulmonary emboli mask; and
extract the set of pulmonary emboli candidates from the pulmonary emboli mask.

22. The computer readable storage medium of claim 21 wherein the instructions cause the computer to:
apply a k-means clustering algorithm to identify voxels within a hilum vicinity; and remove the identified voxels from the pulmonary emboli mask prior to extracting the set of pulmonary emboli candidates from the pulmonary emboli mask.

23. The computer readable storage medium of claim 21 wherein the instructions cause the computer to remove diaphragm components within the pulmonary emboli mask prior to extracting the set of pulmonary emboli candidates from the pulmonary emboli mask.

24. The computer readable storage medium of claim 4 wherein the instructions cause the computer to remove pulmonary emboli candidates located less than three voxels from the vessel boundary from the filtered set of pulmonary emboli candidates.

25. The method of claim 11 further comprising:
using a two-dimensional filter to remove false positive voxels outside a predetermined size range; and
using a three-dimensional filter to remove false positive voxels greater than a predetermined threshold.

* * * * *